(Model.)
3 Sheets—Sheet 1.
J. W. HULL.
HARVESTING MACHINE.
No. 253,705.
Patented Feb. 14, 1882.
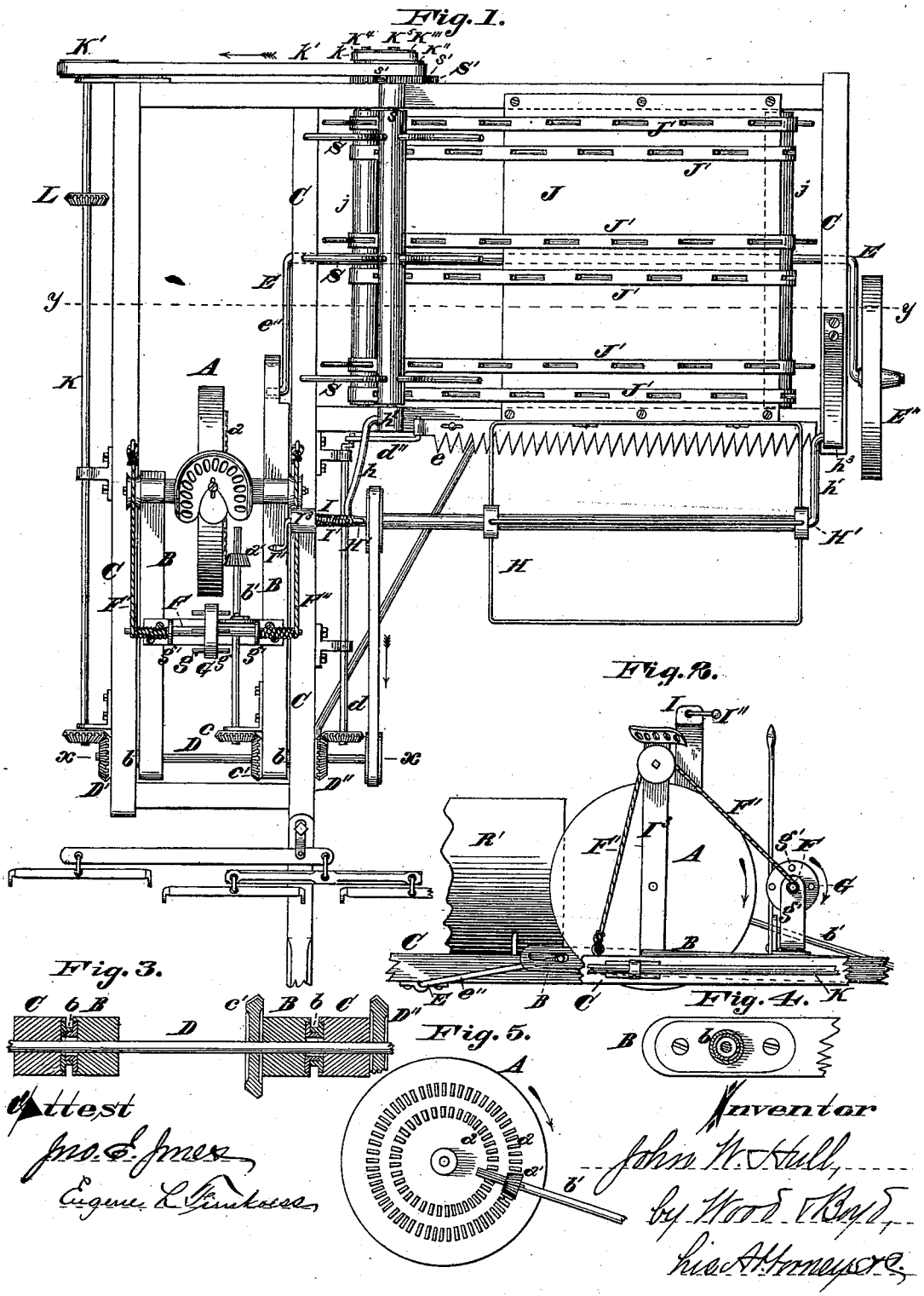

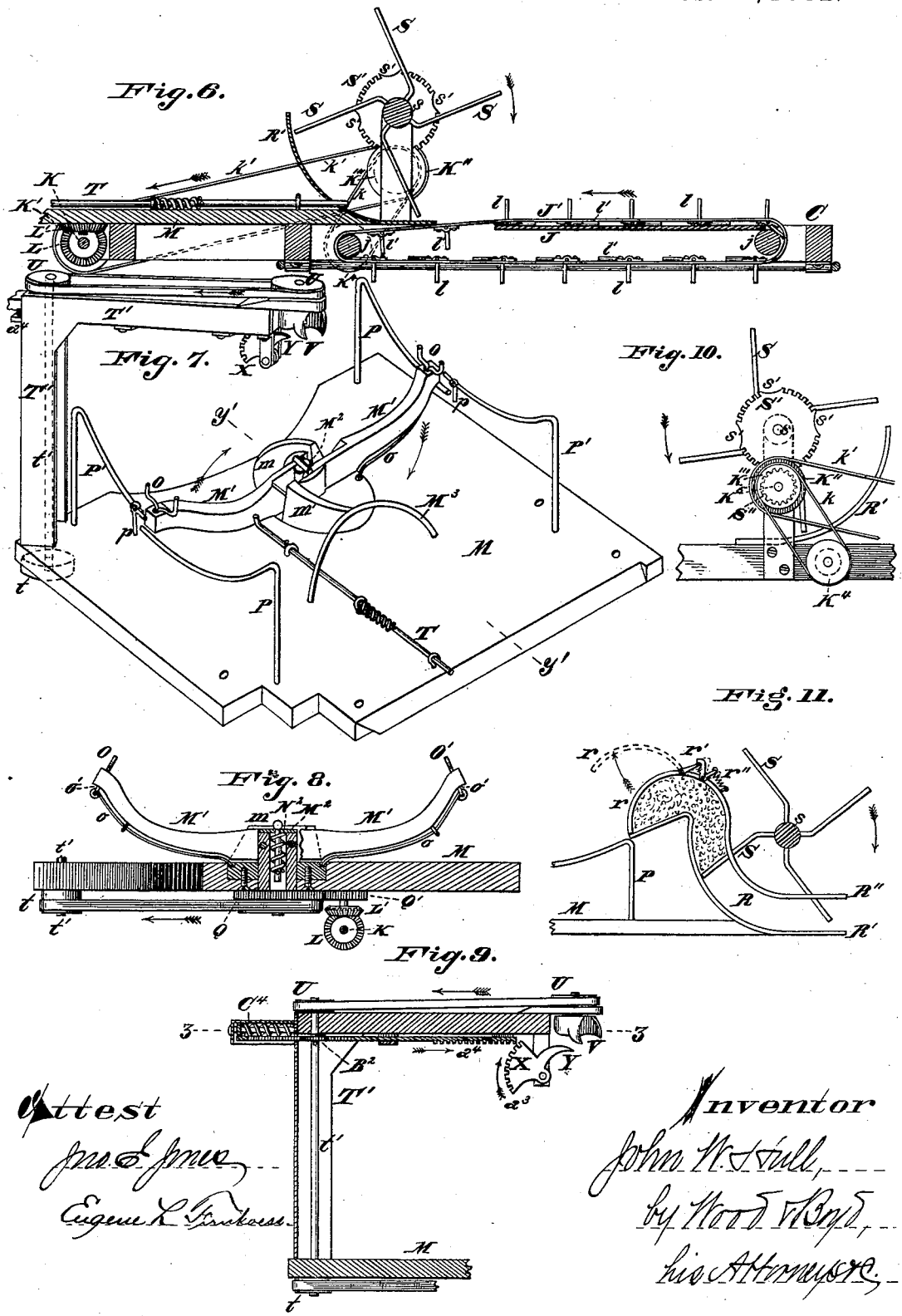

(Model.) 3 Sheets—Sheet 3.
J. W. HULL.
HARVESTING MACHINE.

No. 253,705. Patented Feb. 14, 1882.

Attest
Jno. L. Jones
Eugene L. Firnkoess

Inventor
John W. Hull
by Wood & Boyd
his Attorneys

UNITED STATES PATENT OFFICE.

JOHN W. HULL, OF ALQUINA, ASSIGNOR OF ONE-HALF TO WILLIAM NEWKIRK AND WILLIAM H. WHERRETT, BOTH OF CONNERSVILLE, INDIANA.

HARVESTING-MACHINE.

SPECIFICATION forming part of Letters Patent No. 253,705, dated February 14, 1882.

Application filed May 12, 1881. (Model.)

*To all whom it may concern:*

Be it known that I, JOHN W. HULL, a citizen of the United States, and a resident of Alquina, in the county of Fayette and State of Indiana, have invented certain new and useful Improvements in Harvesting-Machines, of which the following is a specification.

My invention relates to an improvement in harvesters.

The first part of it consists of a new plan of constructing the frame and the method of locating and combining the driving mechanism for operating the cutter-bar; and it consists, first, in providing a pivoted oscillating frame which supports the driving-wheel and driving mechanism, and transmits its motion to the operating parts through a shaft lying within the axis of oscillation, and forms the pivoted point of attachment to the main frame which supports the reaping devices.

A second feature consists of supporting the main frame upon a crank-axle, upon the ends of which cranks the supporting mechanism or wheels are attached, whereby the cutter-bar and main frame can be raised or lowered in vertical planes to regulate the height of the cut. Various other detail features of this part of my invention will be more fully set forth in the description of the accompanying drawings, forming a part of this specification.

The second part of my invention relates to a self-binder which is constructed and operated so as to seize a sufficient amount of straw and withdraw it from the bunch to form the band, and to wrap it around a bundle, and then to twist and tuck a knot thereon by the automatic operation of the device. The several features of this part of my invention will be fully set forth in the description of the accompanying drawings, in which—

Figure 12:
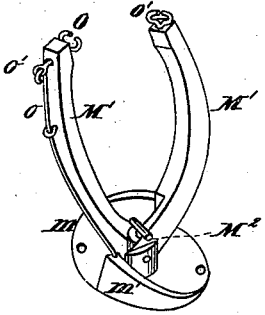
Figure 13:
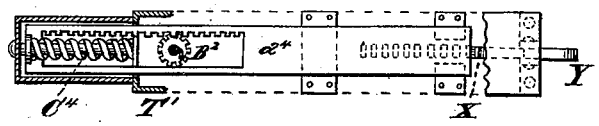
Figure 14:
Figure 15:
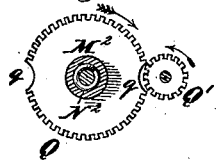

Figure 1 is a plan view of the harvester portion of my invention. Fig. 2 is a broken side elevation of the pivoted oscillating frame which supports the driving-wheel and driving mechanism. Fig. 3 is a transverse section on line *x x*, Fig. 1, showing the pivoted shaft broken off. Fig. 4 is a broken side elevation of the pivotal end of the oscillating frame, showing one of the pivotal plates, the parts upon which the frame hinges being in section. Fig. 5 is a side elevation of the master-wheel, showing its connection with the driving mechanism. Fig. 6 is a sectional elevation on line *y y*, Fig. 1, partially showing the connecting devices which operate the binding mechanism. Fig. 7 is a detail perspective view of the binder. Fig. 8 is a sectional elevation of the binder-table on line *y' y'*, Fig. 7. Fig. 9 is a broken sectional elevation in detail of the devices for twisting and tucking the band. Fig. 10 is a rear elevation of the devices for operating the reel and carrier, the frame being broken off. Fig. 11 is an end elevation, showing the devices for delivering the grain to the binder. Fig. 12 is a detail perspective view of the binder-arms and their operating mechanism, showing them in position when embracing the bundle of grain and ready for the operation of twisting and tucking the band. Fig. 13 is a sectional plan on line *z z*, Fig. 9, of the tucking device. Fig. 14 is an enlarged plan view of the pinion for driving the tucking device, showing the shaft on which it is mounted in section. Fig. 15 is a detail plan view of the gearing mechanism for communicating motion to the binder-arms, the shaft on which the arms are hinged being shown in section.

A represents the ground driving-wheel attached to a proper axle, which is supported in bearings attached to the rear end of vibratory frame B. This supplemental frame is pivoted to the main frame C by means of short hollow sleeve-gudgeons *b b*, which pass through the rails of the main frame.

D represents a transmitting-shaft passing through the gudgeons *b b*, which forms the axis of the vibratory supplemental frame B.

*a a' b' c c'* represent gearing for transmitting motion to the shaft D from the driving-wheel A.

D' D'' represent bevel-gears attached to shaft D, for transmitting motion to the cutter-bar and raking mechanism, respectively.

*d* represents an ordinary crank-shaft.

*d''* represents a pitman for giving reciprocating motion to the cutter-bar *e*.

E represents a crank-shaft, supported in suitable bearings on the main frame C C.

E'' represents one of the supporting-wheels, journaled on the end of the outer crank of the shaft E.

$e''$ represents the inner crank, which is journaled upon the rear end of the vibratory frame B. The frame C being supported by being journaled upon the ends of the cranks of shaft E, and the frame B being supported by the frame C and by the ground driving-wheel A, it is obvious that as the crank-shaft E is turned on its axial center on the frame C C the whole frame is vertically raised and lowered by the motion of the cranks of shaft E, and as frame B oscillates on its pivot-centers $b\ b$, through which the motion of the driving mechanism is conveyed, the relative position of the frame C to the frame B may be changed without affecting the operation of the operating devices.

The feature of raising and lowering the cutter-bars in vertical planes is a very important one, as it preserves the same angle and pitch of the knives in all positions, and as the cranks of the crank-shaft E can be made of any desired length a wide range of cutting adjustment can be secured.

The means employed by me whereby the driver can with his feet readily raise and lower the entire operating mechanism of the machine consist of the following devices:

F represents a windlass-shaft, to which cords F' F'' are attached and wound around the wheel in the manner of a windlass. The other end of the cord is rigidly secured to the supporting or main frame C.

G represents an armed wheel rigidly attached to the windlass-shaft F, which shaft is supported in standards $g'$, of sufficient height to locate the armed wheel G in easy reach of the driver, and is centrally in front of him, so that with his feet resting upon arms $g$ he may turn the wheel G and wind or unwind the chain F' F'', which raises or lowers the main frame C and adjusts the height of the cutting-bar.

The windlass can be held in any given position by means of ratchets and pawls or by any other well-known mechanism.

H' represents a double-armed crank-shaft, the central portion of which forms the axis for the revolving reel H. The cranks $h\ h'$ are bent and form gudgeons which are secured in standards $h^2\ h^3$, attached to the reaper-frame.

Sheets 2 and 3 represent the second part of my invention, and relate to the binding mechanism, which is shown as constructed so as to be combined with the raking apparatus shown in Sheet 1. It can also be readily combined with various other forms of raking apparatus and platforms.

J represents the platform.

J' represents an endless apron, with carriers $l\ l'$ for raking off the grain as it falls thereon.

$j\ j$ represent drums, the revolution of which propels the endless apron J'. The power is transmitted to the drums $j\ j$ from pulley K' on shaft K by means of suitable belts, $k\ k'$, and pulley K'', and they should be placed on shaft K, outside of and in the rear of the platform, so as to be out of the way of the binding mechanism.

L represents a bevel-gear, which meshes with the miter-gear L', attached to the under side of the binder-table M, and is used to propel the self-raking apparatus which is mounted upon the binder-table M, which is rigidly attached to the main platform J.

M' M' represent hinged arms, which are pivoted to a central revolving sleeve, $M^2$, which projects through the table M, and on the lower end of which is a gear, Q.

$m\ m$ represent two circular cams, which are used to raise the arms M' M' as they revolve around to clasp the bundle in the manner shown in Fig. 12.

O O' represent band-grapples, which perform the office of clasping and pulling out of the bundle a sufficient amount of straw to form the band. The grapple-points O O' are drawn together by means of the rod $o$ pulling the staple or loop $o'$ into a recess in the end of the arms M' as the arms are revolved around on sleeve $M^2$.

P P' represent bent arms, upon which the grain is deposited in bundles, ready for binding. One end of each of these arms is securely fastened to the platform M. The free ends of these rods lie opposite each other and opposite the arms M' when they are depressed, as shown in Fig. 7.

$p$ represents fingers attached to the arms P', the upper ends of which fingers project over the wisp of straw drawn out by grapples O O' and separate it from the remainder of the bundle. The ends of the arms P are made flexible, so as to move downward as the arms M' turn and withdraw the straw band from the bundle, which passes out of the spaces between the arms P P'. Arms M are driven by gears Q Q'. The gear Q is provided with two blank spaces. It receives its motion from Q', which is transmitted through the bevel-gear L L'.

R represents a curved chute formed between the apron R' and guide-rods $r$. The mouth of this chute lies above the bent arms P P', so that the bundles forced through chute R will fall on the bent arms P P'.

$r$ represents a hinged guide-rod, which is provided with a catch, $r'$, and a spring, $r''$. Arm $r$ is caused to rise by the pressure of the bundle moved through the chute by the revolving of the reel arms S, as shown in Fig. 11, so that the pressure of the reel-arm S raises the hinge-rod $r$ and throws the bunches of grain onto the bent arms P P', ready for binding. As soon as the arm S has passed the point where it discharges a bunch the spring $r''$ brings the hinged rod $r$ back in position. This motion interrupts the discharge of bunches upon the binder-table long enough to allow the binding-arm M' M' to bind a bundle. The reel S is mounted upon a shaft, $s$, and is driven by gear S'' and belt $k'$ from pulley K' and shaft K. The spaces $s'$ on the face of gear S' are for the purpose of causing the reel S to work intermittently instead of discharging the bunches continuously on the binders' table. The carriers $l\ l$ pass each side of the arms S, and the grain between the arms S and carriers $l$, as it is forced along, presses against the arm S and brings the segments of the gear S' successively into mesh with the small gear S'' and intermittently deposits the gathered bunches upon the arm M'. The gear Q rests in position as shown in Fig. 15 until a bundle is in the act of being discharged upon the binders' table, when the arms S are caused to engage with the spring-trigger T, which pushes arm M forward and causes the gear Q to move around and mesh with Q', and this sets the binding mechanism into motion. One complete motion of the binding mechanism is completed or formed at each semi-revolution of the gear Q.

T' represents a standard-arm, on which the twisting and tucking mechanism is mounted.

$t$ represents the driving-pulley mounted on shaft $t'$, which is in motion during each semi-revolution of the gear Q. This shaft $t'$ drives two mechanisms, the upper one being operated by pulleys U U, around which passes a belt and rapidly revolves a twisting device, V, which is placed vertically above the ends of the arms M' as their ends are brought nearly in contact to clasp the bundle. The ends of the straw, forming a band which projects through the grapples O O', are rapidly twisted by the open ogee twister V.

To complete the tie I provide a mechanism for tucking the ends of the straw band between the band and bundle, something after the manner of hand-binding. X represents the tucker, which is provided with a curved finger, Y. This tucking device is pivoted upon a hanger attached to the overhanging arm T', and is provided with a segmental gear, $a^3$, which is driven by a rack-bar, $a^4$. This rack-bar is driven forward by pinion $B^2$, which engages with a rack upon one side of the rack-bar $a^4$. Pinion $B^2$ is attached to the shaft $t'$ by ratchet-and-pawl connection, as shown in Fig. 14, so that when shaft $t'$ is revolved the rack-bar $a^4$ is driven forward and carries the tucker X Y rapidly around its axial point. The finger Y in its path engaging with the end of the band tucks the tie, as before described. $C^4$ represents a spring upon the end of rack-bar $a^4$, which is compressed as it is driven forward. As soon as the shaft $t'$ stops in its motion the recoil of the spring $C^4$ will withdraw the rack-bar $a^4$ and the tucker X Y shown in Fig. 9. The ratchet and pawl attached to the gear $B^2$ allows it to revolve backward upon its shaft T' when the revolution of the shaft ceases. The operation is completed just as the arms M' M' are ready to leave their upright position, as they are shown in Fig. 12.

$N^2$ represents a spring attached between the joint of the arms, the recoil of which brings them into the horizontal position shown in Fig. 7, where they are ready to receive a second bundle, which is intermittently thrown upon the bent arm P by the action of the reel S, as before described.

I claim—

1. A harvester-frame composed substantially of the oscillating frame B, on which the driver's seat is mounted, and supporting-frame C C, the crank-shaft E, wheels A E'', and mechanism on the oscillating frame for raising and lowering the supporting-frame, substantially as herein set forth.

2. In a harvesting-machine, the oscillating frame B, supported upon the driving-wheel and attached to the main frame by axial bearings $b\ b$, through which the transmitting-shaft passes and imparts motion to the operating mechanism, substantially as herein set forth.

3. The oscillating frame B, supported upon the ground-wheel A and pivoted to the main frame upon a transmitting-axis, in combination with the supporting-frame C and the windlass F on the oscillating frame, for raising and lowering the frame, substantially as herein set forth.

4. The combination of a crank-shaft and the main frame arranged thereon, and supporting the operating mechanism of a harvester, and capable of rising and falling in a vertical plane, with the oscillating supplemental frame pivoted to said main frame and connected with said crank-shaft, and a drive-wheel attached to the oscillating frame and imparting motion to the mechanism located on the main frame, all substantially in the manner and for the purpose described.

5. In combination with the reel S and curved apron R', the chute-rods R'' and the hinged rod $r$, catch $r'$, and spring $r'''$, for checking the delivery of the grain and allowing it to be deposited intermittently in bunches, in the manner substantially as herein set forth.

6. In a harvesting-machine, a straw-binding mechanism composed substantially of the pivoted revolving arm M', grapples O O', twister V, and tucker X Y, combined to operate in the manner substantially as herein set forth.

7. In a harvesting-machine, a straw-band-tucking mechanism composed substantially of the rotary twister V, mounted on the frame T, and the band-tucker X Y, pivoted on the frame T below the twister, and intermittently operated by a rack-bar, $a^4$, as set forth.

In testimony whereof I have hereunto set my hand in the presence of two subscribing witnesses.

JOHN W. HULL.

Witnesses:
 JOHN W. ROSS,
 MELVIN ELLIS.